Dec. 17, 1929. E. W. R. KLENOW 1,739,906
MOTION CONTROLLING DEVICE
Filed Nov. 20, 1926
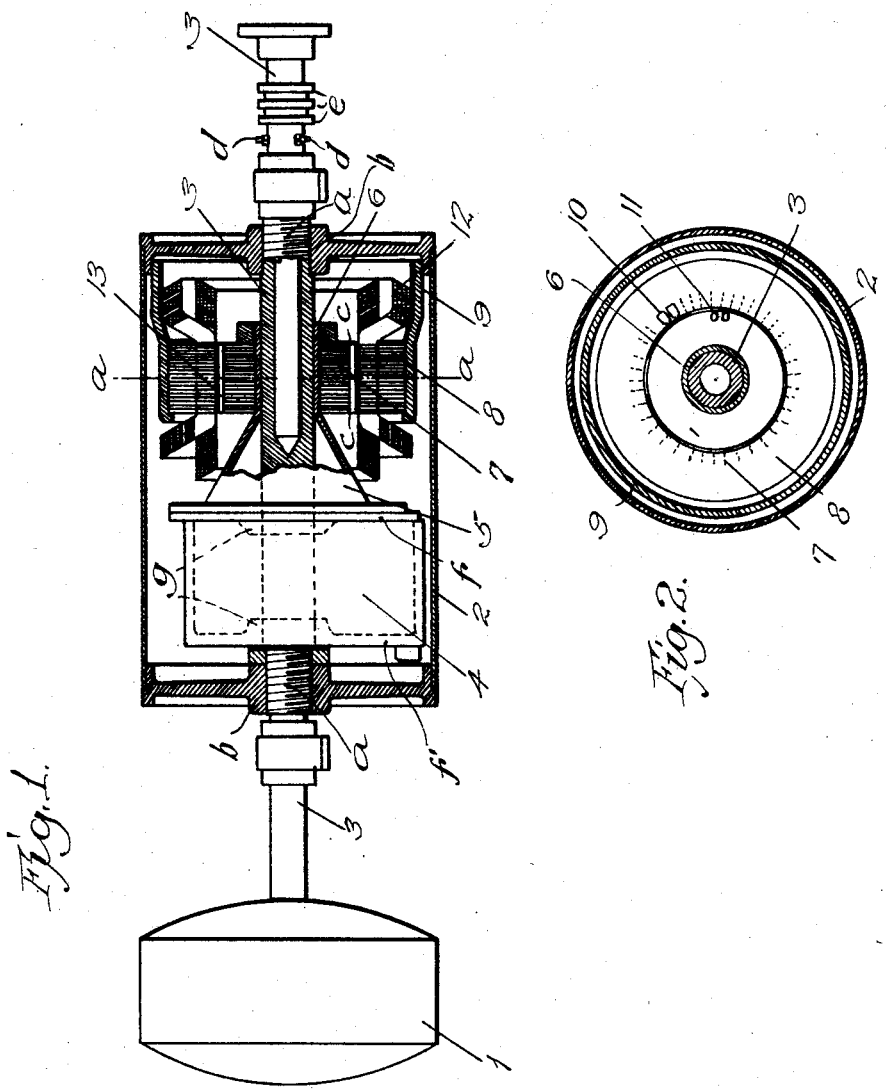
Inventor:
Erik Wilhelm Robert Klenow Patented Dec. 17, 1929

1,739,906

UNITED STATES PATENT OFFICE

ERIK WILHELM ROBERT KLENOW, OF FREDERIKSBERG, NEAR COPENHAGEN, DENMARK

MOTION-CONTROLLING DEVICE

Application filed November 20, 1926, Serial No. 149,660, and in Denmark November 23, 1925.

The present invention relates to a device having for its general object to prevent freely suspended machine parts, that are actuated by a turning moment due to the rotation of another machine part, from rotating in consequence of the said turning moment, as long as the latter does not exceed a certain limit.

In various entirely encased machines, for instance refrigerating machines according to the Audiffren-Singrün principle, gravity is utilized to maintain in position a portion of the encased machinery, in such a manner that the latter cannot rotate, the result being that the desired effect, for instance in the above mentioned example a pumping, may be attained in consequence of the motion of the rotary casing with relation to the machine parts enclosed by the latter and maintained in position by gravity.

This known arrangement is subject to the drawback that when an overload occurs, for instance in the above mentioned case due to rising of the temperature of the cooling water or to failure of the supply of cooling water, the machine parts normally held in position by gravity will commence to rotate; and the same thing will happen if some accident occurs in the machine which prevents the normal free motion of the movable parts, for instance if a bearing or a piston becomes overheated, if an axle or a crank shaft becomes bent, or the like.

When the non-balanced and as a rule heavy machine parts that are normally held in position by gravity are set into rotation, however, very intense centrifugal actions will be produced in certain cases with the result that the machine will be exposed to heavy vibrations, and may easily become damaged, and especially at high speeds a considerable danger will be present. The heretofore known machines of the said kind are therefore all designed for relatively low rotary speeds, the consequence being, however, that the machines from a mechanical point of view will be large and heavy with relation to their output.

The present invention has for its object to remedy this drawback, and according to the invention this result is attained by employing certain electro-magnetic means or devices to prevent the rotation of the machine parts which normally must not follow the rotation of the rotary machine parts. The machine parts concerned may then be balanced completely or almost completely, in such a manner that the rotation of said parts, which will occur in case of an overloading of the machine or owing to a failure of the braking device, or in consequence of some similar accident, and which will cause the said machine parts to rotate at the same or approximately the same number of revolutions as the other machine parts, whereby the output of the machine will cease, does not cause the generation of dangerous centrifugal forces.

The above mentioned braking by electromagnetic means may be attained by fitting the machine parts that are to be prevented from rotating with an armature which is actuated by a magnetic field. The said field may be produced within the casing in any suitable manner, for instance in the manner described hereinafter. In the accompanying drawing, Figure 1 is a sectional elevation of a refrigerating machine according to the Audiffren-Singrün principle, provided with electro-magnetic means to prevnt the rotation of the encased machine parts, and Fig. 2 is a cross-section on line $a$—$a$ in Fig. 1.

1 is the evaporator housing and 2 the compressor housing of a refrigerating machine according to the Audiffren-Singrün principle, which is well known and need not be described. The said two housings 1 and 2 are rigidly connected to a driving shaft 3, extending through and beyond the housing 2. In the case of housing 2, the end members thereof are provided with internally-threaded bosses $b$ which are engaged with threads $a$ formed on shaft 3 to effect the rigid connection desired. The said shaft itself is made hollow to receive conductors (not shown) leading from a winding 12, hereinafter referred to, to terminals $d$ which may be connected in any suitable manner to slip rings $e$ on the shaft. These rings coact in the usual way with brushes (not shown) to feed the winding 12 with alternating current.

The housing 2 surrounds a small compressor 4 of known kind, which is freely suspended from the shaft 3 and should be prevented from rotating together with the shaft 3 and the housings 1 and 2. In order to attain this purpose the compressor 4 is provided with a sleeve having a conical part 5 adjacent the compressor and a cylindrical part 6 which fits loosely on the shaft 3; the part 5 being secured to the removable end plate $f$ of the compressor. The said plate $f$ and the other plate or end member $f'$ of the compressor are formed with internal bearing bosses $g$ wherein shaft 3 loosely fits.

7 is an annular iron core disposed coaxial with the shaft 3 and surrounding the cylindrical sleeve part 6, to which said core is rigidly connected. 8 is another iron core, which is coaxial with the iron core 7 and surrounds it, and which is secured to the housing 2 by means of a suitable support 9, so that the iron core 8 will rotate together with the housing 2. The iron cores 7 and 8, which preferably should be laminated, are formed with slots 11 and 10, Fig. 2, in the manner known from alternating current induction motors.

In the iron core 8 there is generated a field for instance by means of a polyphase alternating current winding 12 (mentioned above) in the slots 10, which field is rotatable in space relatively to the iron core 8 and actuates the iron core 7 when its direction of rotation is opposite the direction of rotation of the housing 2, and the rotary speed of the latter or of the said field must be selected in such a manner that the field will either be stationary in space or move at a speed that is slow relatively to the rotary speed of the rotating machine parts.

The inner iron core 7 may be fitted with a squirrel cage winding or some other short-circuit winding, in such a manner that the general construction of the braking device becomes similar to an asynchronous motor, the stator 8 of which rotates in a direction opposite of that of the rotary field, and the rotor 7 of which is stationary or rotates at a number of revolutions that is low in relation to the cynchronous number of revolutions and corresponds for instance to the asynchronous slip. The squirrel cage winding may comprise rods 13 interconnected at their ends by rings $c$, said rods and the slots in the armature wherein they are received being of circular section.

I declare, that what I claim is:—

1. The combination, with a rotary shaft, and a housing secured to said shaft to rotate therewith, of a member within the housing freely supported on the shaft; an armature disposed in said housing coaxially with said member and rigidly connected with that member; and means for setting up a magnetic field rotating in space in a direction opposite to that of the housing to act on said armature and thereby check the rotation of said member.

2. The combination, with a rotary shaft, and a housing secured to said shaft to rotate therewith, of a member within the housing freely supported on the shaft; an inner annular core disposed in said housing coaxially with said member and rigidly connected with that member; an outer annular core concentrically surrounding the first core and rigidly connected with the housing; and means for creating in the outer core a magnetic field which rotates in a direction opposite to that of the housing to act on the inner core and thereby check the rotation of said member.

3. A construction according to claim 1, in which the armature is provided with a short-circuit winding.

4. A construction according to claim 2, in which the inner annular core is provided with a short-circuit winding.

In testimony whereof I affix my signature.

ERIK WILHELM ROBERT KLENOW.